(12) United States Patent
Schieler et al.

(10) Patent No.: US 11,482,743 B2
(45) Date of Patent: Oct. 25, 2022

(54) METHOD FOR PRODUCING A HIGH-VOLTAGE ENERGY STORAGE DEVICE FOR A MOTOR VEHICLE, AND HIGH-VOLTAGE ENERGY STORAGE DEVICE FOR A MOTOR VEHICLE

(71) Applicant: AUDI AG, Ingolstadt (DE)

(72) Inventors: Oliver Schieler, Gaimersheim (DE); Thomas Weiss, Boehmfeld (DE)

(73) Assignee: AUDI AG, Ingolstadt (DE)

( * ) Notice: Subject to any disclaimer, the term of this patent is extended or adjusted under 35 U.S.C. 154(b) by 299 days.

(21) Appl. No.: 16/771,100

(22) PCT Filed: Jan. 29, 2019

(86) PCT No.: PCT/EP2019/052041
§ 371 (c)(1),
(2) Date: Jun. 9, 2020

(87) PCT Pub. No.: WO2019/170322
PCT Pub. Date: Sep. 12, 2019

(65) Prior Publication Data
US 2020/0343609 A1 Oct. 29, 2020

(30) Foreign Application Priority Data
Mar. 7, 2018 (DE) ..................... 10 2018 203 375.7

(51) Int. Cl.
*H01M 10/6568* (2014.01)
*H01M 10/613* (2014.01)
(Continued)

(52) U.S. Cl.
CPC .......... *H01M 10/6568* (2015.04); *B60K 1/04* (2013.01); *B60L 50/64* (2019.02); *B60L 58/26* (2019.02);
(Continued)

(58) Field of Classification Search
None
See application file for complete search history.

(56) References Cited

U.S. PATENT DOCUMENTS

2012/0298433 A1* 11/2012 Ohkura ................. H01M 50/20
180/65.21
2012/0312614 A1 12/2012 Fujiwara et al.
(Continued)

FOREIGN PATENT DOCUMENTS

DE 102009006990 A1 8/2010
DE 102013011895 A1 1/2015
(Continued)

OTHER PUBLICATIONS

Notification of Transmittal of Translation of the International Preliminary Report on Patentability dated Sep. 17, 2020 in corresponding International Application No. PCT/EP2019/052041; 9 pages.
(Continued)

*Primary Examiner* — Lisa S Park
(74) *Attorney, Agent, or Firm* — Maier & Maier, PLLC (57) ABSTRACT

A method for producing a high-voltage energy storage device which is designed for storing electric energy, for a motor vehicle, in which storage modules are at least partially arranged in a receptacle space of a storage box of the high-voltage energy storage device, having the following steps: providing a base cooling structure of the storage box wherein the base cooling structure includes two cover elements spaced apart from one another and cooling ducts, which extend between the cover elements and through which a coolant fluid can flow.

19 Claims, 3 Drawing Sheets

(51) Int. Cl.
*H01M 10/625* (2014.01)
*H01M 10/6556* (2014.01)
*H01M 50/20* (2021.01)
*B60K 1/04* (2019.01)
*B60L 50/64* (2019.01)
*B60L 58/26* (2019.01)
*B60K 6/28* (2007.10)

(52) U.S. Cl.
CPC ....... *H01M 10/613* (2015.04); *H01M 10/625* (2015.04); *H01M 10/6556* (2015.04); *H01M 50/20* (2021.01); *B60K 6/28* (2013.01); *B60Y 2200/91* (2013.01); *B60Y 2200/92* (2013.01); *H01M 2220/20* (2013.01)

(56) References Cited

U.S. PATENT DOCUMENTS

| | | | |
|---|---|---|---|
| 2014/0315064 A1 | 10/2014 | Katayama et al. | |
| 2016/0172726 A1* | 6/2016 | Enning | H01M 10/625 |
| | | | 429/120 |
| 2016/0222631 A1 | 8/2016 | Kohno et al. | |
| 2019/0229309 A1* | 7/2019 | Newman | H01M 50/20 |

FOREIGN PATENT DOCUMENTS

| | | |
|---|---|---|
| DE | 102014212540 A1 | 12/2015 |
| DE | 102014226566 B3 | 4/2016 |
| DE | 102015111749 A1 | 1/2017 |
| DE | 102015224777 A1 | 6/2017 |
| DE | 102016110335 A1 | 12/2017 |
| DE | 102017202768 A1 | 8/2018 |
| EP | 3382774 A1 | 10/2018 |
| EP | 3427986 A1 | 1/2019 |
| WO | 2017/207502 A1 | 12/2017 |

OTHER PUBLICATIONS

German Search Report dated Nov. 26, 2018 in corresponding German Application No. 10 2018 203 375.7 24 pages; Machine translation attached.

International Search Report with English translation and Written Opinion with Machine translation dated May 31, 2019 in corresponding International Application No. PCT/EP2019/052041; 20 pages.

\* cited by examiner

METHOD FOR PRODUCING A HIGH-VOLTAGE ENERGY STORAGE DEVICE FOR A MOTOR VEHICLE, AND HIGH-VOLTAGE ENERGY STORAGE DEVICE FOR A MOTOR VEHICLE

FIELD

The disclosure relates to a method for producing a high-voltage energy storage device for a motor vehicle. Furthermore, the disclosure relates to a high-voltage energy storage device for a motor vehicle.

BACKGROUND

Such a method for producing a high-voltage energy storage device, which is designed for storing electric energy and/or electric current, for motor vehicle, in particular for an automobile, is already known, for example, from DE 10 2014 226 566 B3. In the method, storage modules are at least partially arranged in a receptacle space of a storage box of the high-voltage energy storage device.

DE 10 2015 224 777 A1 discloses a battery housing for a traction battery of an electrically operated vehicle, having a housing cover and a housing lower part.

Moreover, a battery receptacle for accommodating battery elements, in particular for a motor vehicle, is known from DE 10 2016 110 335 A1. The battery receptacle comprises a box forming an inner region, which at least partially provides side walls of the battery receptacle.

SUMMARY

An object of the present invention is to provide a method and a high-voltage energy storage device of the type mentioned at the outset, so that a particularly advantageous cooling can be implemented in a particularly advantageous manner.

Advantageous designs having expedient refinements of the invention are specified in the remaining claims.

A first aspect of the invention relates to a method for producing a high-voltage energy storage device, which is designed for storing electric energy and/or electric current, for motor vehicle, in particular for an automobile preferably designed as a passenger vehicle. The high-voltage energy storage device is also referred to as an energy storage device or storage device and is a high-voltage energy storage device, since the high-voltage energy storage device has and/or provides an electric voltage, in particular an electric operating voltage, of greater than 50 V. In particular, the electric voltage, in particular the electric operating voltage, of the high-voltage energy storage device is several hundred volts, to thus, for example, be able to implement particularly high electric powers for electrically driving the motor vehicle, which is designed, for example, as an electric vehicle or hybrid vehicle. In its completely produced state, the motor vehicle comprises the high-voltage energy storage device and at least one electric machine, by means of which at least one wheel and/or the motor vehicle as a whole can be electrically driven. For this purpose, the electric machine is operated in a motor mode and thus as an electric motor. To operate the electric machine in the motor mode, the electric machine is supplied with electric energy, which is stored in the high-voltage energy storage device. Since the motor vehicle can be electrically driven by means of the electric machine, the electric machine is also referred to as a traction machine. Since the traction machine can be supplied using electric energy stored in the high-voltage energy storage device, the high-voltage energy storage device is also referred to as a traction storage device.

The high-voltage energy storage device can be designed, for example, as a battery, i.e., as a high-voltage battery (HV battery), so that then the high-voltage energy storage device is referred to, for example, as a traction battery.

In the method, storage modules are at least partially arranged in a receptacle space of a storage box of the high-voltage energy storage device. The respective storage module comprises, for example, precisely one storage cell, by means of which and/or in which electric energy can be stored. In particular, it can be provided that the respective storage module comprises multiple storage cells for storing electric energy, wherein the storage cells of the respective storage module can be electrically connected to one another. If the high-voltage energy storage device is designed as a battery, the respective storage cell is thus designed, for example, as a battery cell, so that the storage module is then designed as a battery module. In particular, it is conceivable that the battery modules are electrically connected to one another. In this way, particularly high electric powers for driving the motor vehicle can be implemented.

To be able to implement a particularly advantageous cooling in a particularly advantageous manner, according to the invention, the method comprises a first step, in which a base cooling structure of the storage box is provided. The base cooling structure comprises two cover elements spaced apart from one another and cooling ducts, which extend between the cover elements and through which a coolant fluid, in particular a coolant liquid, can flow, and which are fluidically connected to one another, for example. Thus, for example, the cooling ducts form one or more continuous cooling ducts through which the coolant fluid can flow. The respective cooling duct extends, for example, at least substantially in a meandering shape between the cover elements. Since the cover elements of the base cooling structure each at least partially delimit the cooling ducts, the cooling ducts are integrated into the base cooling structure. In particular, the cover elements each delimit the cooling ducts directly, so that the fluid flowing through the cooling ducts can flow directly against and/or touch the cover elements. The base cooling structure delimits the receptacle space of the storage box in a first direction, which extends downward in the vehicle vertical direction, for example, in the installed location of the high-voltage energy storage device. In this case, the high-voltage energy storage device occupies its installed position in the completely produced state of the motor vehicle, which comprises the high-voltage energy storage device in its completely produced state. The base cooling structure is thus a component of the storage box, wherein the component forms both a base delimiting the receptacle space in the mentioned first direction and also comprises the cooling ducts, which are integrated into the base.

The method according to the invention comprises a second step, in which a side wall structure, formed separately from the base cooling structure, of the storage box is provided. The base cooling structure and the side wall structure are thus components of the storage box formed separately from one another, wherein the components are firstly provided in a state separate from one another and/or not connected to one another and thus separately, so that the components are initially not yet connected to one another. The first step and the second step can be carried out in any arbitrary sequence.

In a third step of the method according to the invention, the storage modules are joined with the base cooling structure in that the storage modules are connected, in particular materially bonded, to at least one of the cover elements. Due to this materially-bonded connection of the storage modules to the at least one cover element, a particularly advantageous thermal connection of the storage modules to the at least one cover element and/or to the base cooling structure can be implemented, so that the storage modules are particularly advantageously coupled in a heat-transferring manner to the base cooling structure. A particularly advantageous heat transfer from the storage modules to the base cooling structure can be ensured in this way. As a result, a particularly large quantity of heat can be transported away from the storage modules in a short time, since, for example, heat can be implemented particularly advantageously from the storage modules to the base cooling structure and from there to the coolant fluid flowing through the cooling ducts.

The method according to the invention furthermore comprises a fourth step, which is carried out after the third step. In the fourth step, the base cooling structure which is already or previously joined with the storage modules is joined with the side wall structure, whereby the storage modules are arranged in the receptacle space of the storage box partially delimited by the side wall structure and partially delimited by the base cooling structure. The side wall structure delimits the receptacle space, for example, along a second direction extending perpendicularly to the first direction and along a third direction, which extends perpendicularly to the first direction and perpendicularly to the second direction. For this purpose, the side wall structure comprises, for example, first side walls, which are arranged spaced apart from one another along the second direction and thus laterally delimit the receptacle space along the second direction. Furthermore, the side wall structure comprises, for example, second side walls, which are spaced apart from one another along the third direction and thus laterally delimit the receptacle space along the third direction. By means of the method according to the invention, on the one hand, particularly advantageous cooling of the storage modules and thus of the high-voltage energy storage device can be implemented, since—as described above—a particularly advantageous heat transfer can be implemented from the storage modules to the base cooling structure and from there to the coolant fluid. On the other hand, the advantageous cooling can be implemented in a particularly simple and in particular cost-effective manner, since the fourth step is carried out chronologically after the third step. Therefore, the storage modules are joined with the base cooling structure in a state in which the base cooling structure is still detached or separated from the side wall structure, i.e., before the side wall structure is connected to the base cooling structure. The base cooling structure is only joined with the side wall structure after the storage modules have been joined with the base cooling structure, so that the high-voltage energy storage device can be produced in a quick and cost-effective manner.

Since the base cooling structure and the side wall structure are the components of the storage box formed separately from one another, wherein the components are firstly separate from one another and are then connected to one another, the storage box is formed in multiple parts, i.e., as a multipart storage box, which enables the described sequence of the third step and the fourth step and therefore a simple and cost-effective production. If the high-voltage energy storage device is designed, for example, as a high-voltage battery, the storage box is those also referred to as a battery box.

The invention is based in particular on the following finding: Modern high-voltage battery storage systems, in particular for electric vehicles (BEVs) are to meet high accident requirements and thus have a particularly advantageous accident behavior, are to be sealed against environmental influences such as moisture, and/or to be able to accommodate the largest possible number of storage modules or storage cells, to be able to achieve a high energy density, i.e., high electric powers. In addition, the storage modules are to be fastened so that excess movements or displacements of the storage modules are avoided during an accident. At the same time, it is desirable for the storage modules to be able to be removed easily, i.e., taken out of the receptacle space, in case of service and/or in case of a repair. Moreover, a heat dissipation of thermal energy from the storage modules is to be possible.

This typically has the result that a sealed storage housing having a compartment structure is used, wherein the storage modules, which are also referred to simply as modules, are screwed and/or clamped into the battery housing. A seal of the battery housing is ensured, for example, by using a deep-drawn tray, by seal welds of a tray structure, or by sealing off by means of a seal. Depending on the concept, a cooling coil is subsequently inserted into the storage modules and/or into the battery housing or the modules are thermally connected by so-called gap pads or gap filler to a base and/or a cover of the battery housing, in which the cooling is integrated or with which the cooling is joined.

Conventional high-voltage energy storage devices typically have the disadvantage of the high number of heat transfers, since the efficiency of the cooling is reduced by every heat transfer. Moreover, the very thin cooling profiles are costly to produce, and an additional process is required for attaching the profiles to the housing. Furthermore, a gap of up to 3 mm typically has to be filled with a gap filler in a costly manner. The gap filler has to be displaced with the aid of a screw technology, which can result in high reworking rates due to faulty screw curves. Moreover, the gap filler has good adhesive properties, because of which very high forces have to be applied to remove the modules. A reduction of forces would be possible by peeling off the modules, but this would not be permitted by the compartment structure.

With regard to screwed-in modules having profiles and/or pipes laid in the battery tray as the cooling, undesired effects can occur in the event of damage to the pipes and an escape of coolant liquid accompanying this. In the case of screwed-in modules and cooling integrated into the tray base and/or tray cover, the number of thermal transitions can be significantly reduced, but a gap of up to 3 mm still has to be filled with gap filler in a costly manner. The gap filler has to be displaced with the aid of a screw technology, which can result in high reworking rates due to faulty screw curves. Moreover—as already described—the gap filler has good adhesive properties, because of which very high forces have to be applied to remove the modules.

The above-mentioned disadvantages and problems can be avoided by means of the method according to the invention. In particular, the method according to the invention enables the implementation of a simple removal capability, which can thus be carried out in a quick and cost-effective manner, in the scope of which the storage modules can be taken out of the storage space in a simple manner and thus, for example, repaired or maintained or replaced.

For example, to be able to take the storage modules out of the receptacle space in a particularly simple manner and thus repair, maintain, or replace them, it is provided in one embodiment of the invention that in the fourth step, the base cooling structure is connected in a reversibly detachable manner to the side wall structure. In other words, in the fourth step, the base cooling structure is connected to the side wall structure in a nondestructively detachable manner, so that the base cooling structure can be detached from the side wall structure after its connection to the side wall structure, without damage or destruction of the side wall structure or the base cooling structure occurring.

A further embodiment is distinguished in that in the fourth step, the base cooling structure is screwed together, in particular in a reversibly detachable manner, with the side wall structure. In this way, a particularly strong cohesion of the base cooling structure with the side wall structure can be implemented, so that the receptacle space can be sealed off in a particularly advantageous manner.

In addition, due to the integration of the cooling ducts in the base cooling structure, an undesired escape or an undesired flow of the coolant fluid can be avoided, so that a particularly advantageous accident behavior of the storage box and thus of the high-voltage energy storage device as a whole can be displayed.

It has furthermore been shown to be particularly advantageous if the base cooling structure is sealed off in relation to the side wall structure by means of at least one seal element provided in addition to the base cooling structure and in addition to the side wall structure. In this way, for example, an undesired escape of media from the receptacle space to the surroundings of the storage box can be reliably avoided, so that a particularly advantageous accident behavior can be displayed.

To implement a particularly good seal in this case, it is provided in a further design of the invention that the seal element is arranged at least partially between the base cooling structure and the side wall structure.

In one particularly advantageous embodiment of the invention, a seal is used as the seal element, which is arranged in the solid state on the base cooling structure or the side wall structure and is thus, for example, arranged at least partially between the base cooling structure and the side wall structure. A foam seal or a molded seal and/or a rubber seal can be used as the seal, for example.

In a further, particularly advantageous design of the invention, the seal element is arranged in the liquid and/or viscous or solid state on the base cooling structure or the side wall structure. Thus, for example, a liquid seal or a viscous seal is used as the seal element, whereby particularly good leak tightness can be provided in a cost-effective manner.

To be able to implement a particularly advantageous thermal connection of the storage modules to the base cooling structure, it is provided in a further design of the invention that in the third step, the storage modules are connected in a materially-bonded manner to the at least one cover element, in particular adhesively bonded and thus materially bonded. An adhesive having a high thermal conductivity is preferably used for this purpose, so that a particularly advantageous heat transfer from the storage modules to the at least one cover element and thus to the base cooling structure can be ensured.

In a further design of the invention, the base cooling structure comprises multiple base elements, which are partially arranged adjacent to one another and partially mutually overlap. In this way, for example, the base elements can particularly advantageously be sealed off in relation to one another and to the side wall structure, whereby an advantageous accident behavior is displayable in a cost-effective manner.

In a further embodiment of the invention, the side wall structure comprises struts, which are arranged in the receptacle space in the fourth step and thus divide the receptacle space into respective receptacle chambers, in which the storage modules are arranged in the fourth step. A particularly high rigidity can be implemented in a weight-favorable and cost-effective manner by the struts, for example, so that a particularly advantageous accident behavior of the high-voltage energy storage device can be ensured.

Moreover, the receptacle chambers and/or the struts enable partitioning of the storage modules in relation to one another, so that, for example, the propagation of a thermal event and/or a spread of such a thermal event from storage module to storage module can at least be slowed.

It has proven to be particularly advantageous in this case if precisely one of the storage modules is arranged in the respective receptacle chamber. The respective storage module can thus be protected particularly well, so that an advantageous accident behavior can be implemented.

A second aspect of the invention relates to a high-voltage energy storage device for a motor vehicle, wherein the high-voltage energy storage device is produced by means of a method according to the invention. The invention also includes refinements of the high-voltage energy storage device according to the invention, which comprise features as have already been described in conjunction with the refinements of the method according to the invention. For this reason, the corresponding refinements of the high-voltage energy storage device according to the invention are not described again here.

Furthermore, the invention includes a motor vehicle which comprises a high-voltage energy storage device according to the invention and/or at least one high-voltage energy storage device which is produced by means of a method according to the invention.

BRIEF DESCRIPTION OF THE DRAWINGS

Exemplary embodiments of the invention are described hereafter. In the figures.

DETAILED DESCRIPTION

The exemplary embodiments explained hereafter are preferred embodiments of the invention. In the exemplary embodiments, the described components of the embodiments each represent individual features of the invention to be considered independently of one another, which each also refine the invention independently of one another and are thus also to be considered to be part of the invention individually or in combinations other than those shown.

Furthermore, the described embodiments can also be supplemented by other ones of the above-described features of the invention.

In the figures, functionally-identical elements are each provided with the same reference signs.

In the following, embodiments of a method for producing a high-voltage energy storage device 10 (FIG. 4) for a motor vehicle are explained on the basis of the figures. Electric energy and/or electric current can be stored by means of the high-voltage energy storage device 10 and/or in the high-voltage energy storage device 10. In the completely produced state, the motor vehicle comprises the high-voltage energy storage device 10 and at least one electric machine, by means of which the motor vehicle can be electrically driven. The motor vehicle is designed, for example, as an electric vehicle or as a hybrid vehicle. To electrically drive the motor vehicle by means of the electric machine, the electric machine is operated as an electric motor and thus in a motor mode. For this purpose, the electric machine is supplied with electric energy, which is stored in the high-voltage energy storage device 10. Since the motor vehicle can be electrically driven by means of the electric machine, the electric machine is also referred to as a traction machine. Therefore, the high-voltage energy storage device 10 is also referred to as a traction storage device.

The high-voltage energy storage device 10 is a high-voltage component, the electric voltage of which, in particular electric operating voltage, is greater than 50 V. In particular, the electric voltage is several hundred volts, to thus be able to implement particularly high electric powers for driving the motor vehicle. In particular, the high-voltage energy storage device 10 is a battery, i.e., a high-voltage battery.

Figure 4:
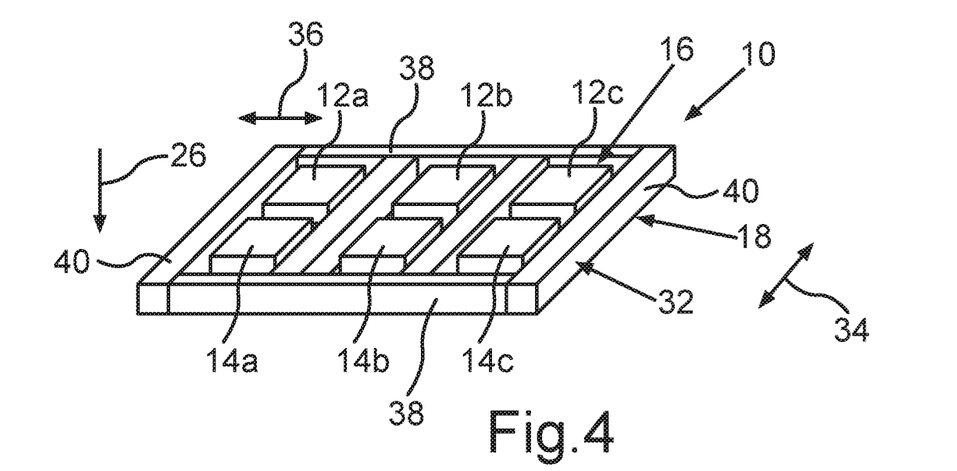
FIG. 4 shows a schematic perspective view of the high-voltage energy storage device.

As will be explained in greater detail hereafter and as is apparent with the aid of FIG. 4, in the scope of the method, storage modules 12a-c and 14a-c are arranged in a receptacle space 16 of a storage box 18, also referred to as a battery box.

Figure 1:
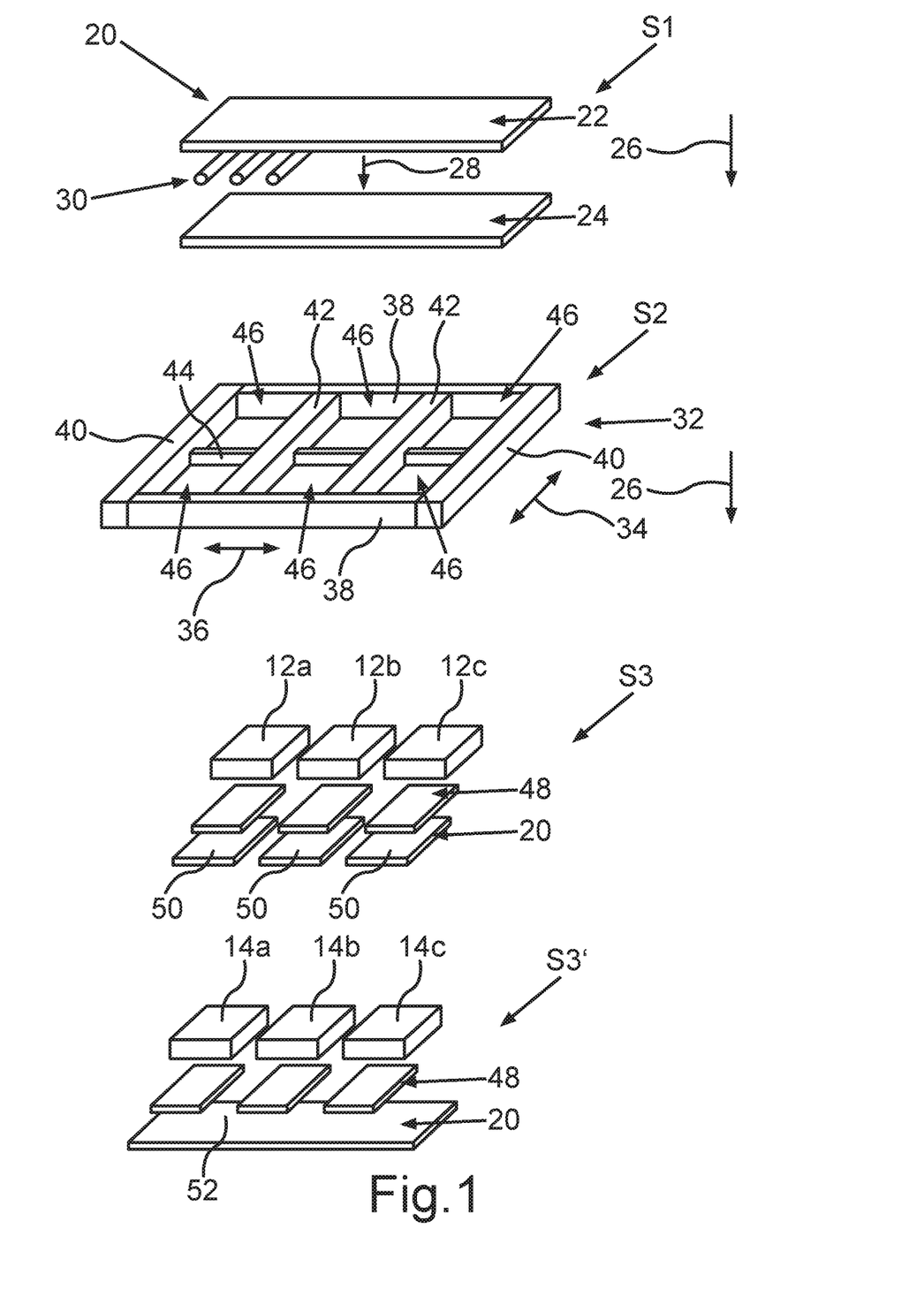
FIG. 1 shows schematic views of steps of a method according to the invention for producing a high-voltage energy storage device for a motor vehicle.

In order to be able to implement a particularly advantageous cooling and particularly advantageous accident behavior of the high-voltage energy storage device 10 in a particularly advantageous manner, the method comprises a first step S1. In the first step S1, a base cooling structure 20 of the storage box 18 is provided. In particular, the base cooling structure 20 is produced in the first step S1. It is apparent from FIG. 1 that the base cooling structure 20 comprises a first cover element 22 and a second cover element 24, which are arranged one on top of another and at the same time at a distance from one another and are connected to one another. As is apparent in consideration together with FIG. 4, the base cooling structure 20 is used to delimit the receptacle space 16 in a first direction illustrated by an arrow 26 in FIG. 4, so that the base cooling structure 20 is a base of the storage box 18. In the installation position of the high-voltage energy storage device 10, the first direction illustrated by the arrow 26 coincides with the vehicle vertical direction and extends downward in the vehicle vertical direction at the same time. In this case, the high-voltage energy storage device 10 occupies its installation position in the completely produced state of the motor vehicle. The cover elements 22 and 24 are arranged one over another along the first direction and spaced apart from one another in this case and—as illustrated in FIG. 1 by an arrow 28—are arranged one on top of another or one over another and connected to one another during the first step S1.

The respective cover element 22 or 24 is, for example, a plate. In particular, the respective cover element 22 and 24 can be formed from a sheet-metal plate, so that, for example, the cover element 22 is a base sheet-metal plate and the cover element 24 is a cooling sheet-metal plate of the base cooling structure 20. The base cooling structure 20 additionally comprises cooling ducts 30, which are schematically illustrated especially in FIG. 1 and through which a coolant fluid, in particular a coolant liquid can flow, and which are arranged along the first direction between the cover elements 22 and 24. The cooling ducts 30 are, for example, fluidically connected to one another, so that the cooling ducts 30 form a continuous overall cooling duct through which coolant fluid can flow. In particular, the cooling ducts 30 are at least partially, in particular completely, formed and/or delimited by the cover elements 22 and 24, so that, for example, the coolant fluid flowing through the cooling ducts 30 can flow directly against the cover elements 22 and 24 and can thus directly touch and/or contact them. A particularly advantageous heat transfer from the cover elements 22 and 24 to the coolant fluid flowing through the cooling ducts 30 can thus be ensured. In other words, the cooling ducts 30 are formed, for example, by the cover elements 22 and 24 themselves or the cooling ducts 30 are formed by at least one conduction element, which is formed separately from the cover elements 22 and 24 and is provided in addition thereto, and which is arranged between the cover elements 22 and 24, in particular along the first direction.

In a second step S2 of the method, a side wall structure 32 of the storage box 18 formed separately from the base cooling structure 20 is provided. The side wall structure 32 is used to delimit the receptacle space 16 in a second direction illustrated by an arrow 34 in FIG. 4, which extends perpendicularly to the first direction. Moreover, the side wall structure 32 is used to delimit the receptacle space 16 in a third direction illustrated by a double arrow 36, which extends perpendicularly to the first direction and perpendicularly to the second direction. For this purpose, the side wall structure 32 comprises first side walls 38, which are spaced apart from one another along the second direction and delimit the receptacle space 16 along the second direction. Furthermore, the side wall structure 32 comprises second side walls 40, which are spaced apart from one another along the third direction and delimit the receptacle space 16 along the third direction. The side walls 38 and 40 are connected to one another.

The side wall structure 32 additionally comprises struts 42 and 44 arranged between the side walls 38 and 40. The respective strut 42 is, for example, connected to the respective side walls 38, while the strut 44 is connected to the side walls 40. Further, the respective strut 44 can be connected to the respective strut 42.

It is particularly apparent from FIG. 1 that the receptacle space 16 is divided into respective receptacle chambers 46 by the struts 42 and 44. The respective receptacle chamber 46 is also referred to as a pocket or compartment, so that the side wall structure 32 and/or the storage box 18 as a whole has a compartment structure. Furthermore, it is apparent from FIG. 1 that the side wall structure 32 has a frame shape and/or forms a frame, in which the storage modules 12a-c and 14a-c can be accommodated or are accommodated at least partially, in particular at least predominantly or completely. Steps S1 and S2 can be carried out in any arbitrary sequence.

The method furthermore comprises a third step S3 or S3', which is carried out after the first step S1 and after the second step S2. A first of the above-mentioned embodiments comprises the third step S3 here, wherein a second of the above-mentioned embodiments comprises the third step S3'. In the third step S3 or S3', respectively, the storage modules 12a-c or 14a-c, respectively, are joined with the base cooling structure 20, in that the storage modules 12a-c and 14a-c are connected in a materially-bonded manner to the base cooling structure. For this purpose, the storage modules 12a-c and/or 14a-c are connected in a materially-bonded manner to at least one of the cover elements 22 and 24. In particular, the storage modules 12a-c and 14a-c are connected, for example, to the cover element 22 and/or to the cover element 24 and thus, for example, to the base sheet-metal plate and/or to the cooling sheet-metal plate.

To ensure a particularly advantageous thermal connection of the storage modules 12a-c and 14a-c to the base cooling structure 20, for example, the storage modules 12a-c and 14a-c are adhesively bonded to the at least one cover element 22 or 24 and thus connected in a materially-bonded manner to the at least one cover element 22 or 24, respectively. A heat-conductive adhesive 48 is used for this purpose, by means of which the storage modules 12a-c and 14a-c are adhesively bonded to the at least one cover element 22 or 24, respectively, and thus to the base cooling structure 20 and are thus connected in a materially-bonded manner. The base cooling structure 20 is an integral base cooling structure, since the cooling ducts 30 are integrated into the base cooling structure 20.

In the first embodiment comprising the third step S3, for example, the base cooling structure 20 comprises precisely one base element 50 per storage module 12a-c, which is adhesively bonded to precisely one of the storage modules 12a-c by means of the adhesive 48. The base elements 50, which are initially formed separated from one another and separately from one another, are connected to one another, for example, in particular after the respective base element 50 has been connected to the respective associated storage module 12a-c.

In the second embodiment comprising the third step S3', for example, precisely one base element 52 of the base cooling structure 20 is associated with a number of the storage modules 14a-c greater than 1, wherein the multiple storage modules 14a-c, which are associated with the base element 52 associated with the storage modules 14a-c, are connected by means of the adhesive 48 to the base element 52. In particular, it is provided in the second embodiment that all storage modules 14a-c are associated with the precisely one base element 52 and/or the base cooling structure 20, so that, for example, all storage modules 14a-c are adhesively bonded by means of the adhesive 48 to the base element 52 shared by the storage modules 14a-c and/or the base cooling structure 20.

Figure 2:
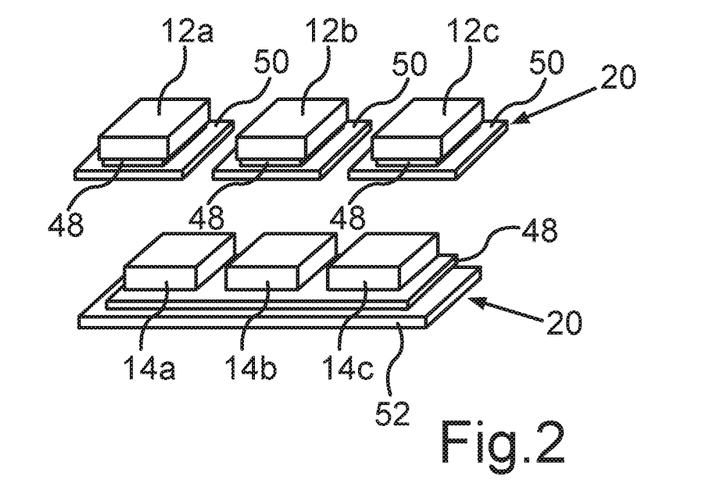
FIG. 2 shows schematic perspective views in detail of storage modules of the high-voltage energy storage device adhesively bonded to base cooling structures.

FIG. 2 shows, in schematic perspective views, the storage modules 12a-c or 14a-c, respectively, adhesively bonded and thus connected in a materially-bonded manner to the base structure 20. The storage modules 12a-c and 14a-c adhesively bonded to the base cooling structure 20 thus form respective, continuous and/or assembled modular units, which are initially still separated or detached from the side wall structure 32.

Figure 3:
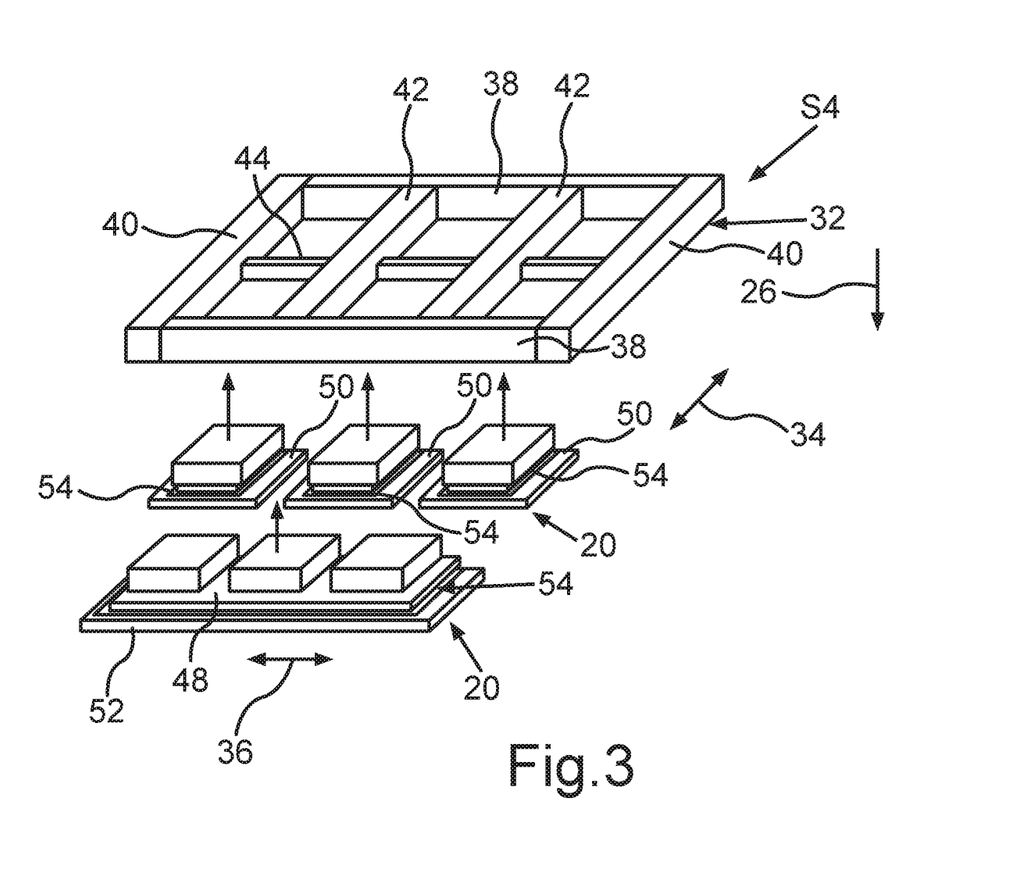
FIG. 3 shows a schematic view of a fourth step of the method.

After the third step S3 or S3', respectively, a fourth step S4 of the method illustrated in FIG. 3 is carried out. In this case, the fourth step S4 is illustrated for both the first embodiment and the second embodiment of the method in FIG. 3. In the fourth step S4, the base cooling structure 20 joined with the storage modules 12a-c and 14a-c is joined with the side wall structure 32, whereby the storage modules 12a-c and 14a-c are arranged in the receptacle space 16 of the storage box 18 partially delimited by the side wall structure 32 and partially delimited by the base cooling structure 20. It is apparent overall from FIGS. 1 to 3 that the storage modules 12a-c and 14a-c are joined with the base cooling structure 20, while the base cooling structure 20 is still separated from the side wall structure 32, i.e., is not yet separated from the side wall structure 32. It is also apparent that the base cooling structure 20 is joined with the side wall structure 32, while the storage modules 12a-c and 14a-c are already joined with the base cooling structure 20. In this way, the high-voltage energy storage device 10 can be produced in a particularly quick and cost-effective manner.

The integral base cooling structure 20 is produced, for example, by roll bonding and/or adhesive bonding and/or soldering. In other words, the cover elements 22 and 24 are, for example, connected to one another in a materially-bonded manner. For example, the cover elements 22 and 24 are connected to one another by adhesive bonding and/or soldering. Furthermore, it is conceivable that the cover elements 22 and 24 are connected to one another by forming, in particular by rolling. In particular, the cover elements 22 and 24 can be connected to one another by roll bonding. In this case, the cover elements 22 and 24 are joined with one another by high pressure.

In the fourth step S4, the base cooling structure 20 is preferably reversibly detachably screwed together with the side wall structure 32 and thus joined with the side wall structure 32, so that the storage modules 12a-c and 14a-c can then be removed again in a simple manner. In particular the following advantages can be implemented by means of the method:
- minimal gaps between the respective storage module 12a-c and 14a-c and the base cooling structure 20 of the storage box 18, whereby an advantageous heat transfer and thus and advantageous heat dissipation can be implemented with a low use of material,
- decoupling the installation of the storage modules 12a-c and 14a-c, which are also simply referred to as modules, from the actual battery assembly process, so that, for example, the side wall structure 32 and/or the respective abovementioned modular unit can be supplied as an assembly on an assembly line, reduction of the so-called S times,
- simple removal due to optimized accessibility, since peeling the modules off of the base cooling structure 20 is possible in a simple manner.
- It is not necessary to disassemble the entire storage box 18 to replace the modules, but rather the side wall structure 32 can remain installed on the motor vehicle, for example, while the base cooling structure 20 and with it the modules are detached from the side wall structure 32.

It is particularly apparent from FIG. 3 that the modules can be maintained, repaired, or replaced in a particularly simple manner in that the base cooling structure 20 is detached from the side wall structure 32, in particular while the side wall structure 32 remains installed on the motor vehicle. Since the struts 42 and 44 are parts of the side wall structure 32, the base cooling structure 20 and with it the modules are also detached from the struts 42 and 44, so that the above-described compartment structure does not obstruct peeling of the modules off of the base cooling structure 20. In the scope of the peeling off, the modules can be detached in a simple manner from the base cooling structure 20. Then, for example, other and/or new modules can be joined with the base cooling structure 20, in particular adhesively bonded.

Before the base cooling structure 20 is connected to the side wall structure 32, for example, at least one seal element, in particular in the form of a molded seal or a viscous seal, is applied, for example, to respective sealing lines. For this purpose, the seal element is applied, for example, to the side wall structure 32 or in the present case to the base cooling structure 20 and at the same time to the at least one cover element 22 or 24, respectively, wherein the seal element is identified by 54 in FIG. 3.

In particular, one seal element 54 is provided per base element 50 or 52, respectively, to be able to seal off the respective base element 50 or 52 and thus the base cooling structure 20 as a whole particularly advantageously in relation to the side wall structure 32. The receptacle space 16 can thus be sealed off in a particularly advantageous manner.

Figure 5:
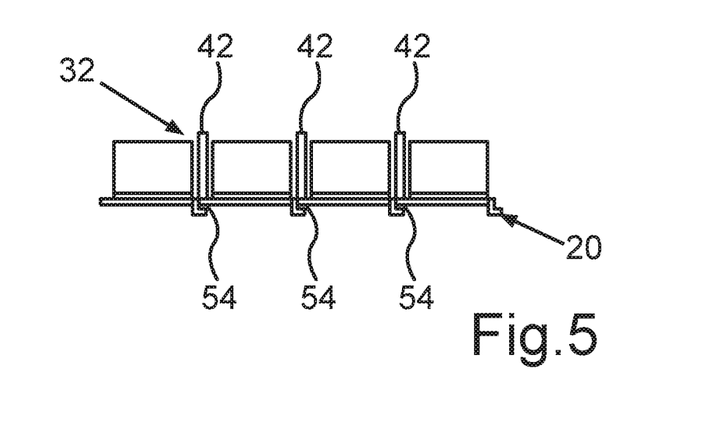
FIG. 5 shows a schematic sectional view of the high-voltage energy storage device.

In order to be able to implement a sufficiently large sealing surface as a whole, for example, it can be provided that the base elements 50 are partially arranged adjacent to one another and partially mutually overlap, so that a cascaded base structure particularly apparent from FIG. 5 is implemented. In other words, the base structure is then nested in a cascaded manner. The respective seal element 54 is used here, for example, to seal off the cascaded nested base elements 50 mutually and in relation to the side wall structure 32. The base cooling structure 20 representing a base structure preferably at least has the area of a module and at most has the area of a complete storage box 18. In this case, the modules are joined with the base structure. The modules are preferably adhesively bonded in a heat-conductive manner to the base structure. This is done by applying the adhesive 48 to the at least one cover element 22 or 24 or to a respective module base of the respective module. The respective module is subsequently compressed with the base cooling structure 20 to thus connect the modules solidly to the base cooling structure 20 in a materially-bonded manner. A minimal adhesive gap is set in this case. An integral structure in the form of the above-mentioned modular unit results therefrom, which is then joined with the storage box 18 and/or with the side wall structure 32. For this purpose, for example, the seal element 54, which is, for example, a molded seal, a foam seal, or a viscous seal, is applied to the at least one cover element 22 or 24, respectively. The base cooling structure 20, which is adhesively bonded to the modules and is provided with the seal element 54, is then inserted into the side wall structure 32 and at the same time into the compartment structure and joined by means of a further joining technology with the side wall structure 32. A screwing process is preferably provided as the joining technology, in the scope of which the base cooling structure 20 is reversibly detachably screwed together with the side wall structure 32. The modules can thus subsequently be removed again easily.

The invention claimed is:

1. A method for producing a high-voltage energy storage device designed for storing electric energy, for a motor vehicle, in which storage modules are arranged at least partially in a receptacle space of a storage box of the high-voltage energy storage device, comprising:
   a) providing a base cooling structure of the storage box, wherein the base cooling structure comprises a plurality of base elements, each base element separately formed from two cover elements spaced apart from one another and cooling ducts, which extend between the cover elements and through which a coolant fluid can flow;
   b) providing a side wall structure of the storage box formed separately from the base cooling structure;
   c) joining each of the storage modules with the base elements of the base cooling structure, in that the storage modules are joined with at least one of the cover elements and each base element is fixed to one storage module; and
   d) after step c) joining the base cooling structure, which is joined with the storage modules, with the side wall structure, thus dividing the receptacle space into a plurality of receptacle chambers, whereby the storage modules are arranged in the receptacle space of the storage box partially delimited by the side wall structure and partially delimited by the base cooling structure such that each receptacle chamber holds one storage module.

2. The method as claimed in claim 1, wherein in step d), the base cooling structure is reversibly detachably connected to the side wall structure.

3. The method as claimed in claim 1, wherein in step d), the base cooling structure is screwed together, reversibly detachably, with the side wall structure.

4. The method as claimed in claim 1, wherein the base cooling structure is sealed off in relation to the side wall structure by means of at least one seal element provided in addition to the base cooling structure and in addition to the side wall structure.

5. The method as claimed in claim 4, wherein a seal, which is arranged in the solid state on the base cooling structure or the side wall structure, is used as the seal element.

6. The method as claimed in claim 4, wherein the seal element is arranged in the viscous or solid state on the base cooling structure or the side wall structure.

7. The method as claimed in claim 1, wherein in step c), the storage modules are adhesively bonded to the at least one cover element.

8. The method as claimed in claim 1, wherein the base elements are partially arranged adjacent to one another and partially mutually overlap.

9. The method as claimed in claim 1, wherein the side wall structure comprises struts, which are arranged in the receptacle space in step d) and thus divide the receptacle space into the receptacle chambers, in which the storage modules are arranged in step d).

10. A high-voltage energy storage device for a motor vehicle in which storage modules are arranged at least partially in a receptacle space of a storage box of the high-voltage energy storage device, wherein the high-voltage energy storage device comprises:
   a) a base cooling structure of the storage box, wherein the base cooling structure comprises a plurality of base elements, each base element separately formed from two cover elements spaced apart from one another and cooling ducts, which extend between the cover elements and through which a coolant fluid can flow; b) a side wall structure of the storage box formed separately from the base cooling structure; c) the storage modules are joined with the base elements of the base cooling structure, in that the storage modules are joined with at least one of the cover elements, and each base element is fixed to one storage module; and d) the base cooling structure is further joined with the side wall structure, thus dividing the receptacle space into a plurality of receptacle chambers, whereby the storage modules are arranged in the receptacle space of the storage box partially delimited by the side wall structure and partially delimited by the base cooling structure such that each receptacle chamber holds one storage module.

11. The method as claimed in claim 2, wherein in step d), the base cooling structure is detachably screwed together with the side wall structure.

12. The method as claimed in claim 2, wherein the base cooling structure is sealed off in relation to the side wall structure by means of at least one seal element provided in addition to the base cooling structure and in addition to the side wall structure.

13. The method as claimed in claim 3, wherein the base cooling structure is sealed off in relation to the side wall structure by means of at least one seal element provided in addition to the base cooling structure and in addition to the side wall structure.

14. The method as claimed in claim 2, wherein the base elements are partially arranged adjacent to one another and partially mutually overlap.

15. The method as claimed in claim 3, wherein the base elements are partially arranged adjacent to one another and partially mutually overlap.

16. The method as claimed in claim 4, wherein the base elements are partially arranged adjacent to one another and partially mutually overlap.

17. The method as claimed in claim 5, wherein the base elements are partially arranged adjacent to another and partially mutually overlap.

18. The method as claimed in claim 6, wherein the base elements are partially arranged adjacent to one another and partially mutually overlap.

19. The method as claimed in claim 7, wherein the base elements are partially arranged adjacent to one another and partially mutually overlap.

\* \* \* \* \*